United States Patent
Dixon et al.

(10) Patent No.: US 6,223,309 B1
(45) Date of Patent: Apr. 24, 2001

(54) METHOD AND APPARATUS FOR ECC LOGIC TEST

(75) Inventors: Robert Christopher Dixon, Austin; Van Hoa Lee, Cedar Park; Thoi Nguyen, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/165,958

(22) Filed: Oct. 2, 1998

(51) Int. Cl.$^7$ .................................................. G06F 11/00
(52) U.S. Cl. ............................................ 714/703; 714/718
(58) Field of Search ............................ 714/718, 30, 42, 714/725, 703, 40, 710; 711/101, 104, 148, 173; 365/201, 185.09, 200, 189.02

(56) References Cited

U.S. PATENT DOCUMENTS

| | | | |
|---|---|---|---|
| 4,475,194 | * 10/1984 | LaVallee et al. | 714/710 |
| 4,561,095 | * 12/1985 | Khan | 714/767 |
| 4,726,021 | * 2/1988 | Horiguchi et al. | 714/773 |
| 4,980,888 | * 12/1990 | Bruce et al. | 714/718 |
| 5,224,107 | * 6/1993 | Mattes | 714/805 |
| 5,392,294 | * 2/1995 | Bosch et al. | 714/719 |
| 5,396,499 | * 3/1995 | Urai | 714/718 |
| 5,581,715 | * 12/1996 | Verinsky et al. | 710/129 |
| 5,657,443 | * 8/1997 | Krech, Jr. | 714/42 |
| 5,875,195 | * 2/1999 | Dixon | 714/719 |
| 5,923,672 | * 7/1999 | Roberts et al. | 714/710 |
| 5,958,072 | * 9/1999 | Jacobs et al. | 714/30 |
| 6,018,817 | * 1/2000 | Chen et al. | 714/762 |
| 6,067,649 | * 5/2000 | Goodwin | 714/718 |
| 6,141,775 | * 10/2000 | Lee et al. | 714/30 |

* cited by examiner

Primary Examiner—Albert Decady
Assistant Examiner—Guy Lamarre
(74) Attorney, Agent, or Firm—Joseph P. Lally; Leslie A. Van Leeuwen

(57) ABSTRACT

An ECC verification circuit including a first biasing circuit that is configured to output a predetermined logical signal. The verification circuit further includes a switch connected between the first biasing circuit and a first data bit line of a memory data bus of a computer system. The memory data bus includes a plurality of data bit lines and a plurality of check bit lines and the computer system includes error correction circuitry that is coupled to the memory data bus. The verification circuit is configured to activate the switch during a verification cycle of the computer system. In this manner, the predetermined logical signal is applied to the first data bit line during the verification cycle. The verification circuit is designed to apply a test state to the data bit lines and check bits lines of the memory data bus. The test state applied to the check bits line varies from the check bit state that would be generated by the ECC unit of the computer system upon receiving the test state that is applied to the data bit lines.

20 Claims, 5 Drawing Sheets

METHOD AND APPARATUS FOR ECC LOGIC TEST

BACKGROUND

1. Field of the Present Invention

The present invention generally relates to the field of error detection schemes and more particularly to a method and circuit for testing error correction circuitry (ECC) associated with a computer system.

2. History of Related Art

The rapid pace at which the price to performance ratio of microprocessor based computer systems such as personal computers has improved since the 1980's has made the choice of such systems viable in a variety of higher end consumer, business, and scientific applications that were previously served exclusively by more costly main frame computers and workstations. As these smaller class of computers are increasingly being used as enterprise systems (i.e., installed in application intensive environments or used as the backbone of local area networks), the reliability of these machines has become an increasingly important market concern. Indeed, enterprise system consumers require and demand essentially zero down time.

To achieve the level of reliability required to compete in the microprocessor based computer system market, enterprise systems manufacturers have devoted greater consideration to techniques for improving reliability. While fundamental techniques for improving reliability by detecting randomly generated data errors such as the use of parity bits or error correction circuitry have been well known for some time, the use of these techniques in the price intensive market for microprocessor based system was until recently thought not to be cost effective. Manufacturers assumed, probably correctly, that the relatively infrequent occurrence of a single bit or multiple bit error in personal computers would be tolerated by the consumer, especially if the alternative was a higher priced system and the originating cause of the error could not be determined with precision, thereby permitting speculation that the application or operating system software caused the error. Such disregard or lack of concern about system reliability has, however, essentially vanished with the advent of a huge market for low cost, high performance, and highly reliable machines. For example, error correction circuitry is now thought to be a checklist item for all but the lowest end of network servers.

The basic operation of ECC in a computer system is widely known. When data is written to a memory location, the computer system generates additional information known as check bits. The check bits are generated based on a Hamming code or other suitable algorithm to be indicative of the data stored in the memory location. When the contents of the memory location are subsequently read by the computer system, the ECC regenerates the check bits and compares the check bits generated during the read operation with the check bits that were generated during the write operation. Any variation between the check bits generated during the read operation (the expected check bits) and the check bits generated during the write operation (the actual check bits) indicates an error in the data. In a typical implementation of ECC, single bit errors are detected and corrected while double bit failures are detected, but not corrected. The ability of ECC to correct single bit errors represents an advantage of ECC over parity based systems, which are capable of detecting but not correcting single bit errors and are entirely unable to detect certain double bit errors. Until the emergence of 64 bit data paths, however, parity based error checking systems were frequently preferred primarily because typical implementations of parity checking in 32 bit data bus systems requires only 4 parity bits, whereas ECC required 7 check bits are required for 32 bit systems. Thus ECC required 75% more error detection memory than parity based systems. In addition, the parity system's inability to detect double bit failures was not considered significant because of the widely disseminated belief that double bits were so rare that they could be treated as essentially non-existent. With the arrival of 64 bit and wider data busses, however, coupled with the increased demand for reliability, the assumption that double bit failures do not exist is no longer acceptable. Moreover, the cost differential between implementing parity versus ECC largely vanishes in 64 bit systems because 8 bits of error detection memory are required regardless of whether parity or ECC is utilized. Accordingly, ECC is rapidly being accepted as the preferred error detection scheme for microprocessor based computer systems.

The error correction circuitry employed in computer systems is typically one of the cornerstones of improved system reliability. The functionality of the ECC is, therefore, critically important if the ultimate goal of zero down time is to be achieved. Unfortunately, however, the ECC itself is typically not implemented with the significant amount of logic that would be required to perform an adequate self check or diagnostic routine due to size and cost constraints. It would be therefore highly desirable to provide a practical, low cost apparatus for performing a functionality verification of the ECC that consumed a relatively small amount of silicon.

SUMMARY OF THE INVENTION

The problem identified above is in large part addressed a method and apparatus for verifying the functionality of error correction circuitry in a computer system. An ECC verification circuit according to the present invention is provided to bias the memory data bus to a predetermined state during a verification cycle of an associated computer system. By incorporating a known error condition into the predetermined state that is applied to the memory data bus, the ECC unit of the computer system can be checked for basic functionality.

Broadly speaking, the present invention contemplates an ECC verification circuit of a computer system including a first biasing circuit that is configured to output a predetermined logical signal wherein the output of the first biasing circuit is connected to a first data bit line of a memory data bus of the computer system. In one embodiment, the verification circuit further includes a switch connected between the first biasing circuit and the first data bit line. In this embodiment, the verification circuit is configured to activate the switch during a verification cycle of the computer system. In this manner, the predetermined logical signal is applied to the first data bit line during the verification cycle. The memory data bus includes a plurality of data bit lines and a plurality of check bit lines and the computer system includes error correction circuitry that is coupled to the memory data bus. The verification circuit is designed to apply a test state to the data bit lines and check bits lines of the memory data bus. The test state applied to the check bits line varies from the check bit state that would be generated by the ECC unit of the computer system upon receiving the test state that is applied to the data bit lines. In other words, the verification circuit forces the memory data bus into a know error condition to verify the functionality of the ECC unit.

In one embodiment, the first biasing circuit includes a biasing resistor coupled in series between a voltage source and the first data bit line. The circuit may further include at least one additional biasing circuit wherein the output of the additional biasing circuit is coupled to at least one of the remaining bit lines of the memory data bus. In one configuration, the first biasing circuit outputs a voltage approximately equal to Vcc and the outputs of the additional biasing circuits are grounded. In this embodiment, the first data bit line is biased to a logical high state while all other remaining bit lines of the memory bus are grounded thereby creating an error condition on the memory data bus that should be detected by a properly functioning ECC unit. In an alternative arrangement, the first biasing is configured to apply either a logical high level or a logical low level to the first data bit line depending upon the value of a selector input to the first biasing circuit. A suitable first biasing circuit in this embodiment might include a 2 to 1 mux, wherein a first input of the mux is connected to a voltage source, a second input is grounded. Another embodiment might further include additional 2 to 1 muxes where each of the data bit lines is coupled to a corresponding 2 to 1 Mux during the verification cycle, with each of the muxes including its own unique selector input. In this manner, the verification circuit can be programmably manipulated to apply any desired logical state to the data bit lines of the memory data bus during verification. The selector inputs may be stored in a selector register of the verification circuit such that the value stored in the selector register is the pattern that is applied to the data bit lines during verification.

The present invention still further contemplates a method of verifying error correction circuitry in a computer system. First a physically unavailable memory address is located within the computer system. The computer system interrupts are then disabled and the memory data bus of the computer system is forced to assume a test state. The memory data bus includes a plurality of data bit lines and a plurality of check bit lines. The test state of the check bit lines varies from an expected state of the check bit lines. The expected state of the check bit lines corresponds to a state of the check bit lines that would be produced by the error correction unit in response to receiving the test state of the data bit lines. Then, while maintaining the test state of the memory data bus, a read cycle of the unavailable memory address is executed to exercise the ECC unit of the computer system. If functioning properly, the ECC unit determines an expected state of the check bits based upon the detected value of the data bits, performs a comparison between the expected state and the test state (i.e., the actual state) of the check bit lines, and detects a variation between them. The process of determining the physically unavailable memory address is suitably achieved by searching a physical memory address space of the computer system until an unused bank is detected and, thereafter, enabling the unused memory bank. In one embodiment, the method further includes, prior to forcing the memory data bus to the test state, executing a write cycle to write the expected state of the data bit lines to the unavailable memory address. In one embodiment, the variation between the test state of the check bit lines and the expected state of the check bit lines is indicative of a single bit line variation between the test state and the expected state of the data bit lines, in which case the ECC unit should further attempt to correct the single bit error by writing the expected data back to memory.

The present invention still further contemplates a computer system incorporating the verification circuit disclosed herein. The computer system includes a central processor and a memory controller coupled to the CPU via a system bus. A system memory of the computer system is coupled to the memory controller via a memory bus. The memory bus includes a memory data bus that is comprised of a plurality of data bit lines and a plurality of check bit lines. The memory controller includes error correction circuitry and an ECC verification circuit connected to the memory data bus. The ECC verification circuit is configured to apply a test state to the data bit lines and the check bit lines during a verification cycle of the computer system. The test state of the check bit lines applied by the verification circuit varies from an expected state of the check bit lines. In one presently preferred embodiment, the memory data bus comprises 64 data bit lines and 8 check bit lines. In its simplest arrangement, the test state of the check bit lines is comprised entirely of logical 0's and the test state of the data bit lines comprises a single logical 1. In an alternative embodiment, the ECC verification circuit includes a selector register and is configured to produce the data stored in the selector register on the data bit lines during the verification cycle.

BRIEF DESCRIPTION OF THE DRAWINGS

Other objects and advantages of the invention will become apparent upon reading the following detailed description and upon reference to the accompanying drawings in which.

Figure 1:
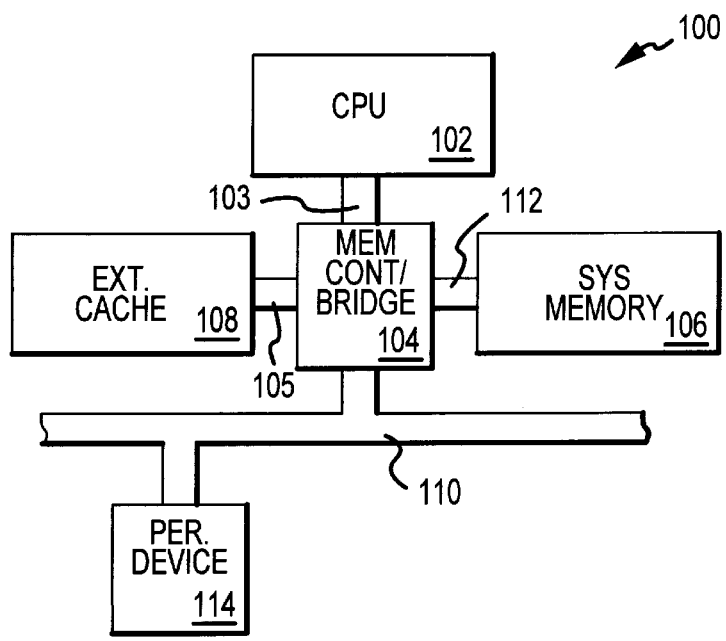
FIG. 1 is a simplified block diagram of a computer system according to the present invention including a memory controller with an ECC verification unit as described herein.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 depicts a simplified block diagram of a computer system 100 according to the present invention. Computer system 100 includes a central processing unit (CPU) 102 such as a microprocessor that is coupled through a processor system bus 103 to an integrated memory controller-bus bridge (MCBB) 104. CPU 102 is primarily responsible for fetching computer instructions and input data stored in a main memory 106, executing the instructions, and storing the results or output data back to memory 106. To minimize processor latency, instructions and data are typically prefetched from system memory 106 and saved in a high speed localized cache memory. The cache memory may comprise an internal cache (commonly referred to as a level one or L1 cache) not shown in FIG. 1 which is integrated into the CPU itself as well as an external, and typically optional, level two or L2 cache indicated in FIG. 1 by reference numeral 108. Whether internal, external, or a combination thereof, cache memories improve system performance by taking advantage of the repetitive nature of memory accesses. More specifically, cache memories provide a high speed storage location for memory addresses recently accessed by CPU 102 recognizing that the majority of memory accesses performed during the execution of a typical computer program access memory locations that have been previously and recently accessed.

External cache 108 is suitably implemented with an array of static RAM cells ranging in size from roughly 256 KB to 1 MB while system memory 106 is most typically comprised of a much larger array of slower, but less costly dynamic RAM cells. The size of system memory 106 varies widely depending upon the application to which computer system 100 is directed. Low end, consumer oriented personal computers may include a system memory size of 32 MB or less while higher end systems may include in excess of 1 GB ($2^{30}$) memory locations. (Many state of the art CPU's are configured with a physical address space of 64 GB or more).

In the depicted embodiment, external cache 108 is coupled to MCBB 104 via a cache bus 105. In an alternative embodiment of computer system 100 not depicted, external cache 108 and cache bus 105 are directly coupled to CPU 102. In such an embodiment, CPU 102 preferably includes an integrated cache memory controller to achieve greater efficiencies in accessing the L2 cache. System memory 106 is coupled to MCBB 108 via memory bus 112. MCBB 108 is still further connected to a peripheral bus 110. MCBB 104 frees CPU 102 from various administrative tasks such as interfacing to system memory 106 and arbitrating ownership of peripheral bus 110. Peripheral bus 110 is typically implemented with an industry standard bus protocol thereby enabling a wide variety of peripheral component manufacturers to design interchangeable and compatible products for use in computer system 100. Exemplary and well known industry standard busses include the Peripheral Components Interface (PCI), Industry Standard Architecture (ISA), and Extended Industry Standard Architecture (EISA). In a preferred embodiment, peripheral bus 110 complies with the PCI standard. FIG. 1 depicts a single peripheral device 114 coupled to MCBB 104 via peripheral bus 110. Examples of peripheral devices that may be connected to peripheral bus 110 include graphics cards, modem and other telephony devices, host adapters such as a SCSI controller, and additional bus bridges for embodiments of computer system 100 in which it is useful to implement multiple bus architectures. In one embodiment, for example, peripheral bus 110 is a PCI bus and peripheral device 114 comprises a PCI-to-ISA bus bridge to provide an ISA compliant bus (not shown) to which ISA compatible peripheral components may be connected.

Figure 2:
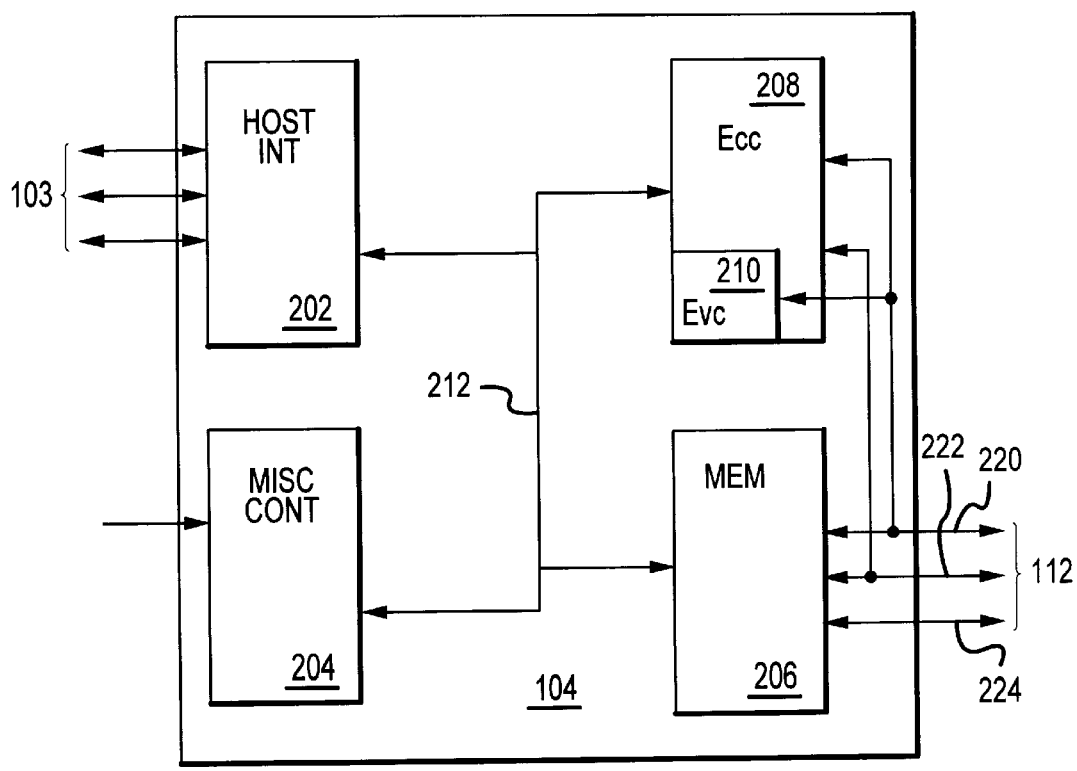
FIG. 2 is a simplified block diagram of the memory controller of FIG. 1 including an ECC unit and an ECC verification circuit according to the present invention.

Turning now to FIG. 2, a simplified block diagram emphasizing the memory control features of MCBB 104 according to the present invention is presented. MCBB includes a host interface 202 for interchanging data, address, and control signals with CPU 102 over processor system bus 103. In addition a memory bus interface 206 serves a similar function by exchanging data, address, and control signals with system memory 106 over memory bus 112. The handling of miscellaneous control signals including various timing, clocking, and power signals is represented by miscellaneous control unit 204. Host interface unit 202, memory interface unit 206, and miscellaneous control unit 204 are interconnected via an internal bus 212. MCBB 104 further includes an ECC unit 208 coupled to internal bus 212. In one implementation common in computer systems employing error correction circuitry, data bus 220 comprises 72 bits including 64 bits of data and 8 check bits. As discussed previously, ECC becomes attractive in 64 bit data bus systems because the 8 check bits are comparable in terms of cost to the 8 parity bits that would be required in a parity type system, yet the error correction circuitry system provides the desirable ability to not only detect, but also correct single bit errors. Memory interface unit 206 and ECC unit 208 are coupled to memory bus 112. Memory bus 112 includes a data bus 220, an address bus 222, and a control bus 224. Data bus 220 and address bus 222 are fed in parallel to ECC unit 208 and memory control unit 206. As will be appreciated to those skilled in the field of error correction circuits, ECC unit 208 generates check bits during system write cycles based on the value of the data during system writes and stores both the check bits and data bits in system memory 106. During a subsequent read operation, the data bits read from system memory 106 are passed to ECC unit 208, which regenerates check bits according to the detected data. The check bits generated during the read operation are then compared to the check bits that were generated during the previous write operation. If a variation between the expected check bits and the actual check bits is detected, ECC unit 208 reports an error and attempts to correct the error if possible by writing the correct data back to system memory.

The ECC unit 208 of the present invention further includes an ECC verification circuit 210 that is coupled to memory data bus 220 of memory bus 112. ECC verification circuit 210 is configured to apply a predetermined logical pattern or "test state" to the data bit lines 306 (shown and described in greater detail below with respect to FIG. 3) and check bit lines 308 that comprise data bus 220 during a verification cycle of computer system 100. The test state that ECC verification circuit 210 is configured to apply to check bit lines 308 varies from the expected state of the check bit lines. The expected state refers to the check bit state that would be generated by ECC unit 208 upon detecting the test state applied to data bit lines 306. By forcing a test state on check bit lines 308 that varies from the expected state, ECC verification circuit 210 deliberately generates a condition that should be detected, reported, and corrected by ECC unit 208 if ECC unit 208 is properly functioning. In this manner, ECC verification circuit 210 provides a practical mechanism for checking the basic functionality of ECC unit 208. In so called mission critical applications in which the consumer expects essentially zero down time, the ability to verify the error correction circuitry provided herein is highly desirable since the error correction circuitry is one of the cornerstones upon which the system's reliability is built.

Figure 3:
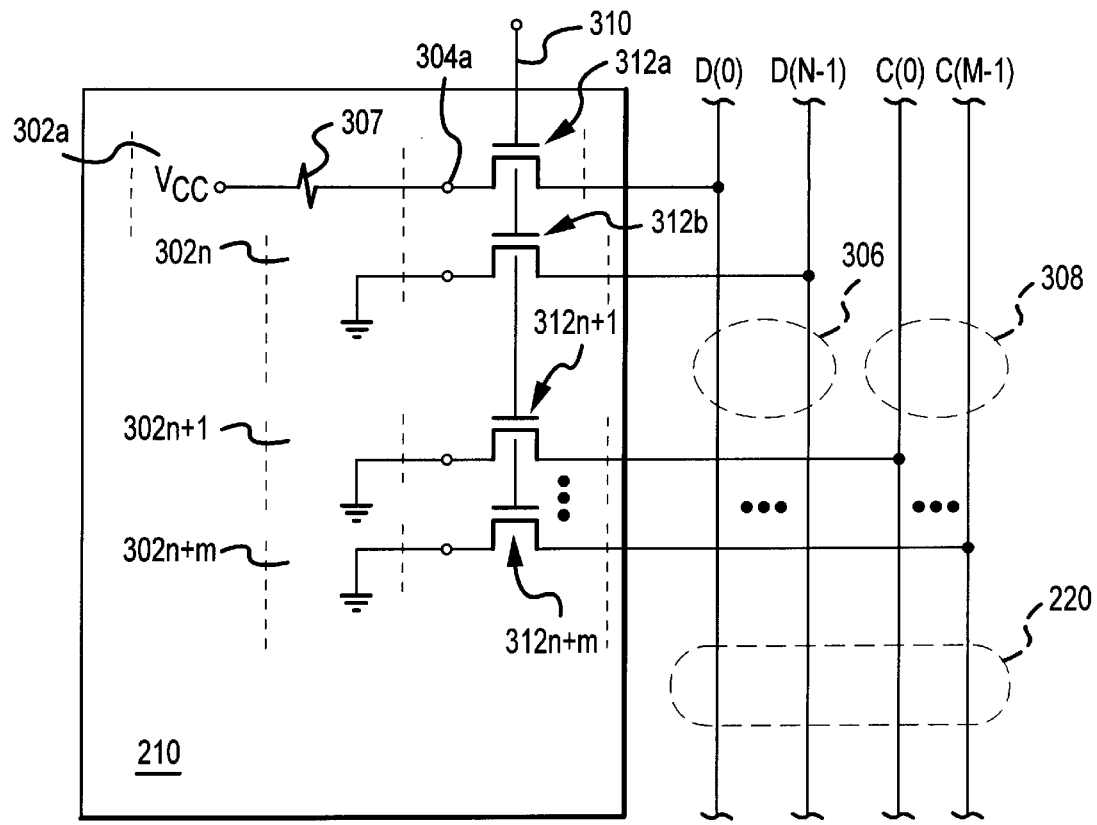
FIG. 3 is a circuit diagram of one embodiment of the ECC verification circuit according to the present invention in which a first data bit line of the memory data bus is biased to a logical high value and remaining memory data bus lines are grounded.

Turning now to FIG. 3, one embodiment of ECC verification circuit 210 according to the present invention is presented. ECC verification circuit 210 includes a first biasing circuit 302a configured to produce a predetermined voltage level at an output terminal 304a of first biasing circuit 302a. The voltage level output by first biasing circuit 302a serves as a logical signal (i.e., a "1" or a "0"). ECC verification circuit 210 further includes a first switch 312a coupled between output terminal 304a of first biasing circuit 302a and a first data bit line, namely, D(0) in the depicted configuration (although any other data bit line could be suitably used as well). An input terminal 310a of switch 312a activates switch 312a thereby applying the voltage level output at output terminal 304a to the first data bit line D(0). In the preferred embodiment, input terminal 310 is activated by computer system 100 or MCBB 104 during a verification cycle specifically dedicated for the purpose of verifying the functionality of ECC unit 208. In the embodiment of ECC verification circuit 210 shown in FIG. 3, first biasing circuit 302a is comprised of biasing resistor 307 connected between a voltage source Vcc of computer system 100 and output terminal 304a. In this embodiment, the logical signal output by first biasing circuit 302a is a logical "1" since the data bit line D(0) is effectively tied to Vcc when switch 312a is activated. As indicated previously, ECC verification circuit 210 is configured to apply a test state to check bit lines 308 that varies from an expected check bit state. In the embodiment shown in FIG. 1, this is accomplished by biasing all remaining bit lines of data bus 220 to logical "0" during the verification cycle while the first data bit line D(0) is biased to a logical "1." Those familiar with error correction circuits will appreciate that a check bit state of 00h (in an 8 bit wide check bit embodiment) corresponds to a data bit state of 0000000000000000h in a conventional implementation of ECC unit 208. If ECC unit 208 detects a check bit state of 00h and encounters a single data bit with a logical "1," ECC unit 208 should detect, report, and attempt to correct the error. Thus, ECC verification circuit 210 forces an erroneous state onto data bus 220 for the purpose of determining the functionality of ECC unit 208.

In the embodiment shown in FIG. 3, biasing of the remaining bits lines is accomplished by coupling each of the remaining bit lines of data bus 220 to additional biasing circuits (identified in FIG. 3 by reference indicators 302n, etc.) through additional switches (identified in FIG. 3 by reference indicators 312n, etc.). In an embodiment, such as the example described above, in which the predetermined state of the remaining bit lines of data bus 200 are all 0's, the additional biasing circuits may consist simply of a connection to ground. Other variations on this arrangement are readily imaginable including a configuration in which a single physical switch acts as switch 312 for all remaining bit lines of data bus 220. Preferably each switch 312 is activated by a single common input terminal 310 such that all biasing circuits are applied to data bus 200 simultaneously. When input terminal 310 of switches 312 is activated, ECC verification circuit 210 thereby applies all 0's to the check bit lines 308, a single "1" to a first data bit line D(0), and a logical "0" to all other data bit lines. This embodiment of ECC verification circuit 210 has the advantage of using only a single resistor and little additional circuitry. If a common switch 212 is used for all grounded biasing circuits 302, additional simplification of ECC verification circuit 210 is achieved resulting in an ECC verification circuit 210 comprised essentially of two transistors, a single resistor tied to a power supply output and the necessary interconnects.

Figure 4:
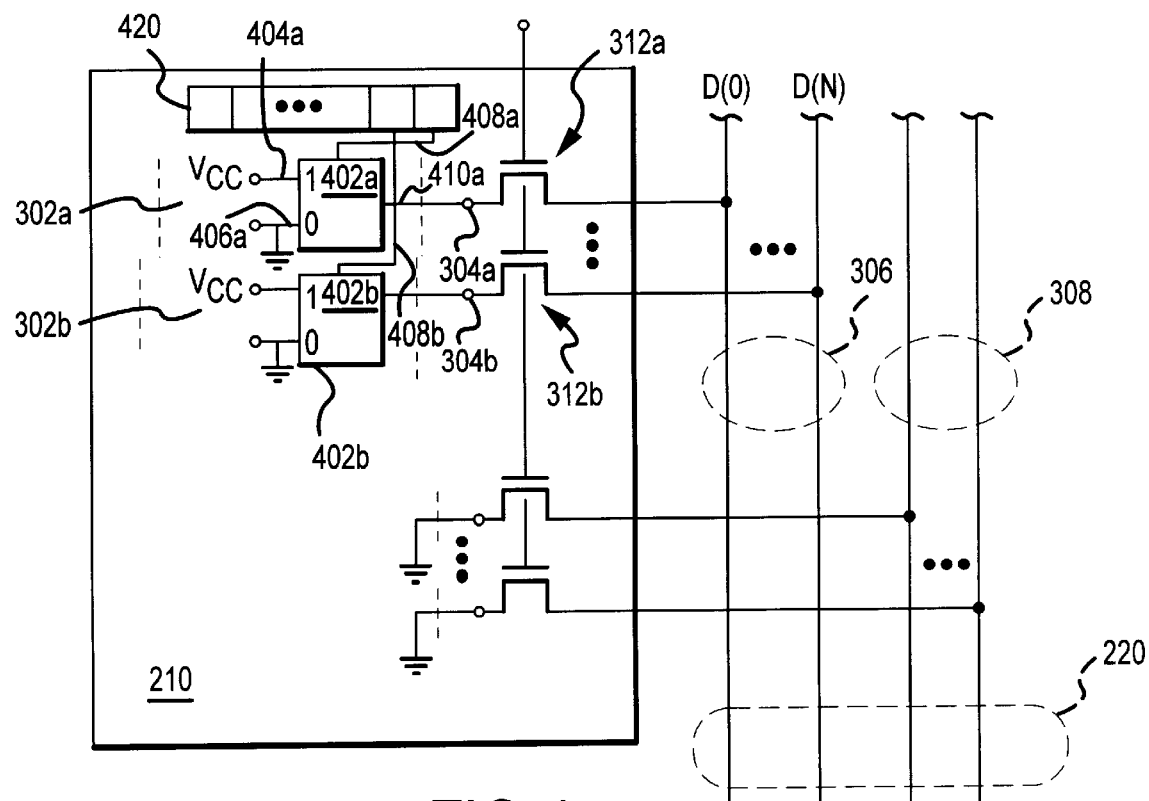
FIG. 4 is a partial circuit diagram of an alternative embodiment of the ECC verification circuit of the present invention including a 2 to 1 mux used as the biasing circuit for applying either Vcc or ground to a first bit line and optionally including additional muxes for applying Vcc or ground to corresponding additional bit lines.

Turning now to FIG. 4, a more expensive but flexible ECC verification scheme is presented. In this embodiment, first biasing circuit 302a replaces the resistor and power supply terminal of FIG. 3 with a 2 to 1 mux 402a in which one of the mux inputs 404a is tied to Vcc while the other input terminal 406a is grounded. A selector input 408a selects which of the two input signals will be coupled to the mux output 410a and applied to first data bit line D(0) of data bus 220 when switch 312a is activated. Thus, in the embodiment depicted in FIG. 4, the signal applied to first data bit line D(0) is programmable. Setting the selector input 408a to 1, results in a 1 being applied to first data bit line D(0) (during a verification cycle of computer system 100) while setting selector input 408a to 0 applies a 0 to the first data bit line. Expanding on this concept, additional 2 to 1 muxes may be included in ECC verification circuit 210 (as exemplified by second biasing circuit 302b in FIG. 4) wherein each mux is associated with a data bit line of memory bus 220 and each mux 402 includes a unique selector input 408. In such an embodiment, it will be appreciated that any desired state may be applied to data bit lines 306 during the verification cycle. In one embodiment, the various selector inputs 408 associated with each of the 2 to 1 muxes 402 are stored in a selector register 420. In this manner the user can apply any desired state to data bits lines 306 during the verification cycle by simply setting the selector register 420 appropriately. This embodiment might be useful in an application in which it is desirable to determine that ECC unit 208 functions properly in detecting single bit errors that occur on each data bit line D(0) through D(n) (where n is the width of the data bus in bits).

Figure 5:
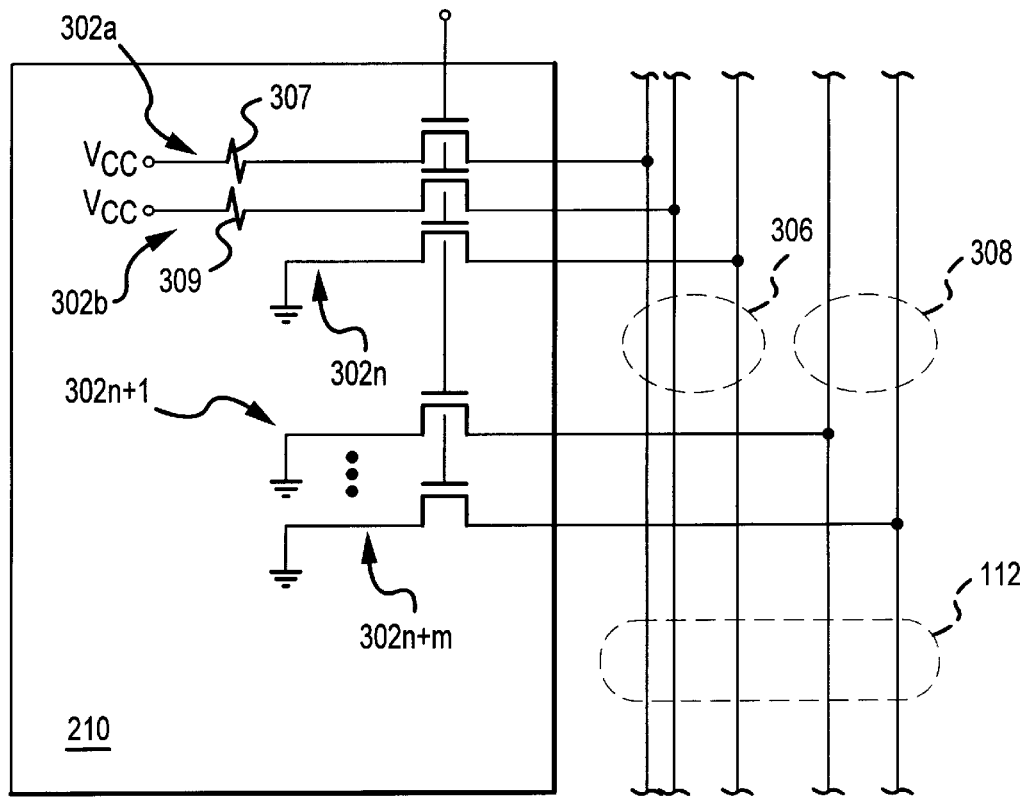
FIG. 5 is a alternative embodiment of the verification circuit in which a double bit failure is simulated through the use of a pair of resistors.

Turning now to FIG. 5, an embodiment of ECC verification circuit 210 is depicted specifically designed to ensure that ECC unit 208 correctly detects double bit errors on data bus 220. In this embodiment, similar to the embodiment of FIG. 3, a pair of biasing resistors 307 and 309 are included in ECC verification circuit 210 to provide a pair of logical 1's to data bit lines (such as D(0) and D(1)) while all remaining data bit lines 306 and check bit lines 308 are biased to logical 0's by grounding them in the manner of FIG. 3. Because error correction circuitry is designed to detect multiple bit errors (whereas parity checkers cannot detect a two bit error if the bits are from a common parity block), the embodiment of ECC verification circuit 210 presented in FIG. 5 is desirable to insure the functionality of the multiple bit error detection of ECC unit 208 without incurring significant additional circuitry beyond the additional resistor. In one embodiment (not depicted), a single common resistor may be tied to a pair of data bit lines to achieve the multiple bit error generation without requiring the extra real estate consumed by the additional resistor.

Figure 6:
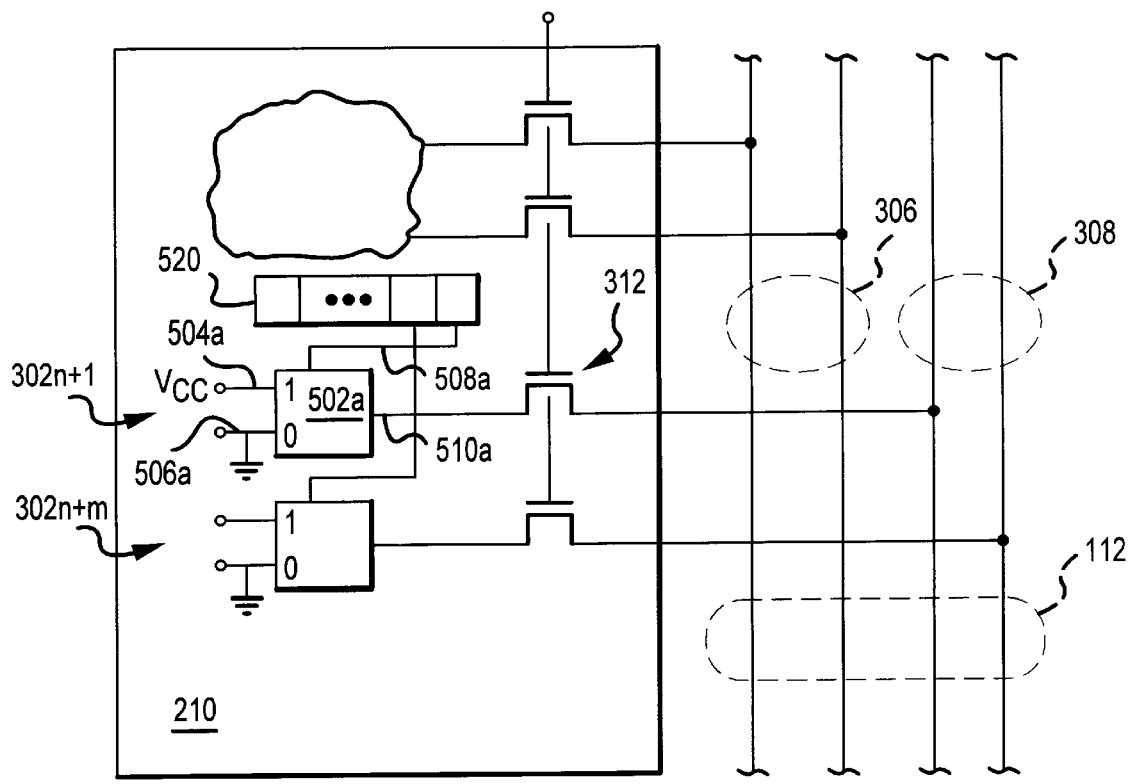
FIG. 6 is an alternative embodiment of the verification circuit in which mulitplexers are incorporated into the biasing circuits to enable programmable manipulation of the test pattern applied to the check bit lines.

Turning now to FIG. 6, an embodiment of ECC verification circuit 210 is depicted in which the 2 to 1 mux concept employed and discussed with respect to FIG. 4 above is applied to the check bit lines 308. Specifically, biasing circuits 302n+1 through 302n+m (where m is the width of check bit bus 308 in bits) are implemented by coupling one or more 2 to 1 muxes 502 to a corresponding number of check bit lines 308. The system is then capable of generating any desired check bit state on check bit lines 308 during the verification cycle. Similar to the muxes 402 of FIG. 4, muxes 502 of FIG. 6 include a "1" input 504 connected to Vcc, a "0" input connected to ground, a selector signal 508 and an output 510 connected to a switch 312. In addition, a check bit selector register 520 analogous to the selector register 420 of FIG. 4 may be incorporated for programmably manipulating the state of check bit lines 308. The configuration of the biasing circuits 302a through 302n may be of the variety described with respect to FIG. 3, FIG. 4, or FIG. 5 depending upon the desired application. In an embodiment in which biasing circuits 302a through 302n are implemented with 2 to 1 muxes as described with respect to FIG. 4, it will be appreciated that the system is configured to apply any combination of states to both the data bit lines 306 and the check bit lines 308. This embodiment might be useful in an application in which it is desirable to be able to programmably verify the full functionality of ECC unit 208.

Figure 7:
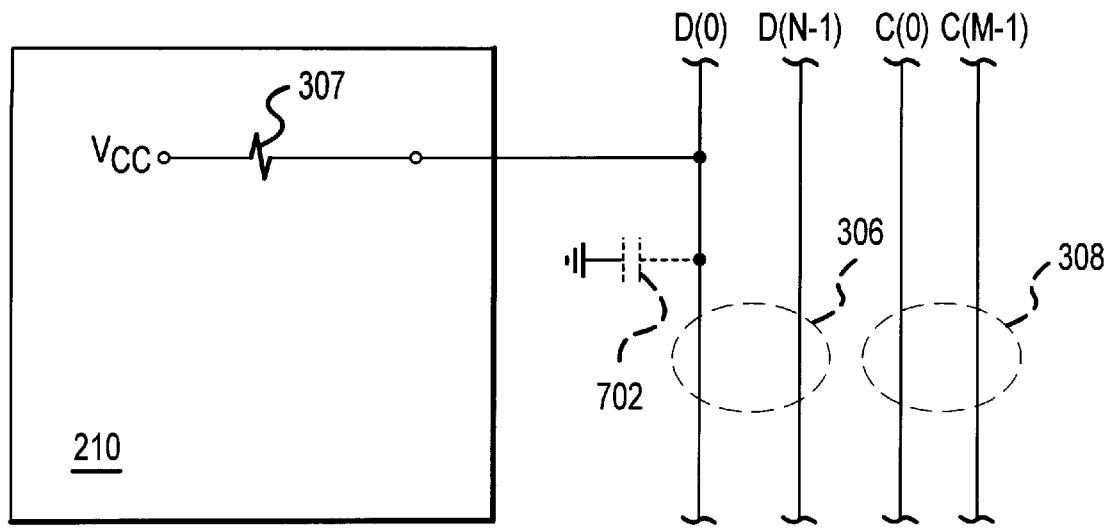
FIG. 7 is an alternative embodiment of the verification circuit comprised of a single biasing resistor tied between Vcc and the first data bit line.

Turning now to FIG. 7, an embodiment of the present invention particularly desirable for its simplicity and low cost is presented. In this embodiment, a first biasing circuit 302a comprises a biasing resistor 307 connected to a power supply voltage such as the Vcc of a computer system and output terminal 304a in a manner similar to the embodiment of the present invention depicted in FIG. 3 and described previously. In the embodiment of FIG. 7, however, output terminal 304a of first biasing circuit 302a is connected directly to first data bit line D(0) thereby eliminating switch 312 of FIG. 3. In this embodiment, the voltage of first data bit line D(0) will rise to Vcc, with a time constant determined by the resistance of biasing resistor 307 and the stray capacitance associated with first bit line D(0) and represented in FIG. 7 by capacitor 702, whenever the bit line is not being driven during a write or read cycle. Using the verification circuit 210 of FIG. 7, an error condition can be simulated by first writing a pattern of all 0's to a fictitious or non-existent physical memory location. This write cycle will drive all lines of memory data bus 220 to logical 0. After termination of the write cycle, all of the bit lines are effectively tri-stated in a "0" condition except first bit line D(0), which will charge to Vcc through biasing resistor 307. After a duration sufficient to allow first data bit line D(0) to charge to Vcc is allowed to pass, the fictitious physical memory location is read by executing a read cycle. Because a logical "1" will be present on first data bit line D(0) while all check bit lines 308 will contain logical "0's", ECC unit 208 of computer system 100 should detect and attempt to correct the error. In this manner, ECC verification circuit 201 permits a basic functionality check of ECC unit 208 using a minimum of additional circuitry.

Figure 8:
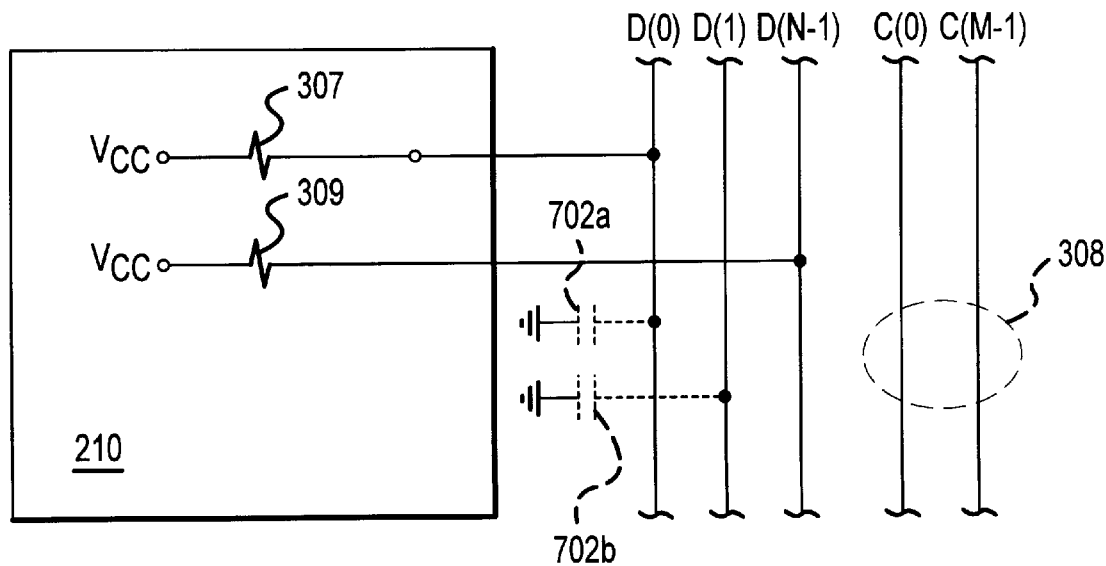
FIG. 8 is an alternative embodiment of the verification circuit comprised of a pair of biasing resistors, preferably with different resistances, coupled to respective data bit lines.

Turning to FIG. 8, an embodiment of ECC verification circuit 210 is presented in which a pair of biasing resistors 307 and 309 as used to simulate single bit and multiple bit errors on memory data bus 220. Each biasing resistor 307 and 309 is tied between Vcc and a corresponding bit line of data bit lines 306. The operation of ECC verification circuit 210 of FIG. 8 is equivalent to the operation of ECC verification circuit 210 shown in FIG. 7 and described above. Because, however, a pair of bit lines are now tied to Vcc, multiple bit errors conditions may be generated to permit verification of the multiple bit error detection capabilities of error verification circuit 208. In one embodiment, the resistance of biasing resistor 307 differs from the resistance of biasing resistor 309. In this embodiment, ECC verification circuit may be used to generate both single bit and multiple bit error conditions. If, for example, the resistance of biasing resistor 309 is significantly (i.e., more than 10%) greater than the resistance of biasing resistor 307, the time constant associated with biasing resistor and stray capacitance 702b will be proportionally greater than the time constant associated with biasing resistor 307 and stray capacitance 702a (assuming that the stray capacitances of data bit lines 306 are approximately equivalent). Thus, the time required to charge the bit line (represented in FIG. 8 by bit line D(1)) to Vcc will be greater than the time required to charge bit line D(0). If all 0's are written to a non-existent physical memory location, this difference in time constants may be utilized to simulate either a single or a multiple bit error condition. If, for example, the time constant associated with biasing resistor 307 and stray capacitance 702a is denoted as T0 and the time constant associated with biasing resistor 309 and stray capacitance 702b is denoted as T1 where T1 is greater than T0, a single bit error condition is simulated by using a pause time TP prior to executing the read cycle where T0<TP<T1, and a double bit error condition is simulated by using a pause time TP before executing the read cycle where T1<TP. It will be appreciated, therefore, that the embodiment of the present invention presented in FIG. 8 provides the flexibility to verify the basic functionality of both the single and multiple bit error detection capabilities as well as the single bit error correction features of ECC unit 208 with a minimal cost (i.e., the cost required to incorporate two semiconductor resistors into the design.

Figure 9:
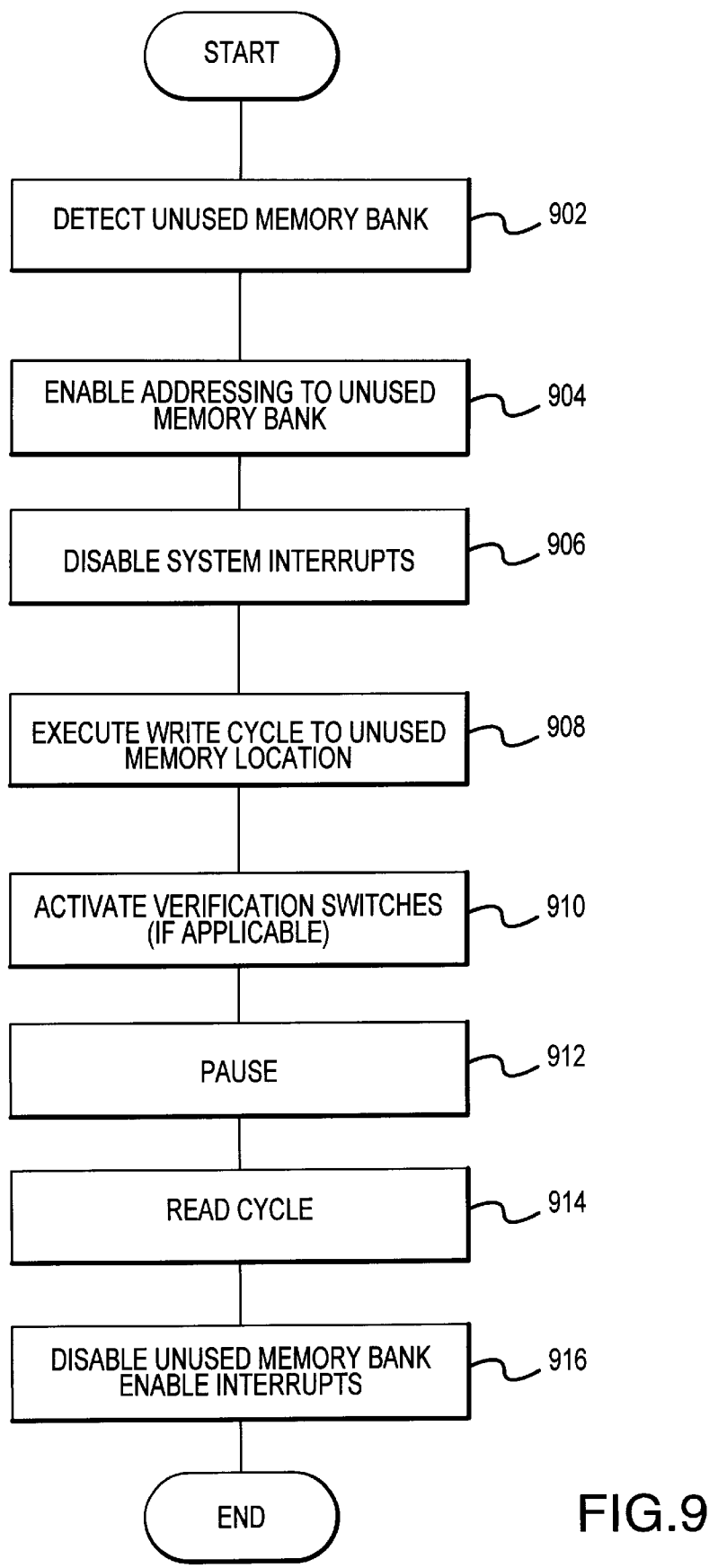
FIG. 9 is a flow diagram of a method of verifying an ECC unit according to the present invention.

Turning now to FIG. 9, a flow diagram is presented for a method of utilizing ECC verification circuit 210. In a preferred embodiment, the method is initiated by searching the physical address space of computer system 100 to detect an unused bank of memory in step 902. After an unused bank of memory is detected, the empty bank is enabled and system interrupts are disabled in steps 904 and 906 respectively. In an embodiment for use with the circuits depicted in FIGS. 7 and 8, a pattern of all 0's is written to an address in the unused memory bank in step 908 to exercise the check bit generation circuit of ECC unit 208 and to drive the date bit lines and check bit lines to all 0's. A verification cycle is then initiated consisting essentially of a pause followed by a read cycle. In embodiments of ECC verification circuit 210 employing one or more switches 312, the input signal 310 of each switch 312 is activated during the verification cycle thereby applying the desired test state to check bit lines 306 and data bit lines 308 in step 910. A system pause is initiated in step 912 to allow the biasing circuits to fully charge the corresponding memory bus bit lines to their desired states taking into account the capacitance associated with each of the lines. After the appropriate pause is completed, a read cycle is executed and the ECC unit 208 is monitored in step 914 to determine if the single bit (or multiple bit) error forced onto the memory data bus was detected. After verification of ECC unit 208, the unused memory bank is disabled to prevent subsequently executed code from writing to physically unavailable memory and system interrupts are enabled in step 916. The method of the present invention may be incorporated into appropriate computer instructions executable by CPU 102 and stored in appropriate storage means such as a read only memory (not shown) associated with computer system 100, on a magnetic media (not shown) such as a hard disk or floppy diskette, or in system memory 106 or external cache 108.

It will be apparent to those skilled in the art having the benefit of this disclosure that the present invention contemplates a circuit and method for exercising and verifying the functionality of error correction circuitry incorporated in a computer system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of verifying error correction circuitry in a computer system, said method comprising:

determining a physically unavailable memory address;

disabling system interrupts;

forcing a memory data bus of said computer system to assume a test state, said memory data bus comprising a plurality of data bit lines and a plurality of check bit lines, wherein said test state of said check bit lines varies from an expected state of said check bit lines, said expected state comprising a state of said check bit lines that would be produced by an error correction circuit of said computer system coupled to said memory data bus in response to receiving said test state of said data bit lines; and while maintaining said test state of said memory data bus, executing a read cycle of said unavailable memory address, wherein said error correction circuit, if functioning properly, receives said test state of said check bit lines and said data bit lines, generates said expected state of said check bit lines in response to receiving said test state of said data bit lines, performs a comparison between said expected state and said test state of said check bit lines, and detects a variation between said test state and said expected state.

2. The method of claim 1, wherein said determining of said physically unavailable memory address comprises searching a physical memory address space of said computer system until an unused bank is detected and, thereafter, enabling said unused memory bank.

3. The method of claim 1, wherein said forcing of said memory data bus comprises executing a write cycle to write said expected state of said data bit lines to said unavailable memory address and, thereafter, executing a system pause for a duration sufficient to allow at least one of said data bit lines to charge through a resistor tied between said one of said data bit lines and Vcc.

4. The method of claim 1, wherein said variation between said test state of said check bit lines and said expected state of said check bit lines is indicative of a single bit line variation between said test state and said expected state of said data bit lines.

5. The method of claim 4, further comprising, upon said detection of said variation between said test state and said expect state of said check bit lines, writing back said expected state of said data bit lines to said unavailable memory address.

6. The method of claim 1, wherein said forcing of said memory bus comprises biasing at least one bit line of said memory bus to a Vcc level of said computer system.

7. The method of claim 6, wherein said biasing comprises connecting said at least one bit line of said memory bus to a first terminal of a bias resistor, wherein a second terminal of said bias resistor is connected to said Vcc level.

8. An ECC verification circuit of a computer system, said verification circuit comprising:

a first biasing circuit configured to produce a predetermined logical state on an output of said first biasing circuit, and further wherein said output of said first biasing circuit is coupled to a first data bit line of a memory data bus of said computer system during a verification cycle in which a memory address bus of said computer is forced to an address of a physically unavailable memory address of said computer system wherein said first data bit line acquires said predetermined logical state during at least a portion of said verification cycle, said memory data bus being coupled to error correction circuitry of said computer system and comprised of a plurality of data bit lines and a plurality of check bit lines; and wherein a test state of said memory data bus during said verification cycle comprises a test state of said data bit lines, including said predetermined logical state of said first data bit line, and a test state of said check bit lines and further wherein said test state of said check bit lines varies from an expected state of said check bit lines, said expected state of said check bit lines corresponding to a check bit state that would be produced by said error correction circuitry upon receiving said test state of said data bit lines.

9. The circuit of claim 8, wherein said first biasing circuit comprises a first biasing resistor including a first terminal connected to a voltage source and a second terminal connected to said first biasing circuit output.

10. The circuit of claim 9, further comprising a second biasing circuit including a second biasing resistor connected between said voltage source and a second biasing circuit output, wherein a resistance of said second biasing resistor is different from a resistance of said first biasing resistor.

11. The circuit of claim 8, further comprising at least one additional biasing circuit, wherein an output of each of said at least one additional biasing circuits is coupled to a corresponding data bit line of said memory data bus.

12. The circuit of claim 8, wherein said first biasing is configured to apply either a logical high level or a logical low level to said first data bit line depending upon the value of a selector input to said first biasing circuit.

13. The circuit of claim 12, further comprising a switch connected between said output of said first biasing circuit and said first data bit line wherein said switch is activated during said verification cycle whereby said output of said first biasing circuit may be disconnected from said first data bit line.

14. The circuit of claim 13, wherein said first biasing circuit comprises a 2 to 1 Mux, wherein a first input of said Mux is connected to a voltage source, a second input is grounded.

15. The circuit of claim 14, further comprising additional 2 to 1 Mux's wherein each of said data bit lines is coupled to a corresponding 2 to 1 Mux during said verification cycle, wherein each of said Muxes includes a unique selector input.

16. The circuit of claim 15, wherein said selector inputs are stored in a selector register of said verification circuit and wherein each bit of said selector register is coupled to a corresponding Mux.

17. A computer system comprising:

A central processor;

A memory controller coupled to said central processor via a system bus; and a system memory coupled to said memory controller via a memory bus, said memory bus including a memory data bus comprised of a plurality of data bit lines and a plurality of check bit lines;

wherein said controller includes error correction circuitry and an ECC verification circuit connected to said memory data bus, and further wherein said ECC verification circuit is configured to apply a test state to said data bit lines and said check bit lines during a verification cycle of said computer system in which a memory address bus of said computer is forced to an address of a physically unavailable memory address, wherein said test state of said check bit lines varies from an expected state of said check bit lines, said expected state of said check bits lines corresponding to a state of said check bit lines generated by said error correction circuitry upon writing said test state of said data bits to memory.

18. The system of claim 17, wherein said memory data bus comprises 64 data bit lines and 8 check bit lines.

19. The system of claim 17, wherein said test state of said check bit lines is comprised entirely of logical 0's and further wherein said test state of said data bit lines comprises a single logical 1.

20. The system of claim 17, wherein said ECC verification circuit includes a selector register, and further wherein said verification circuit is configured to produce the data stored in said selector register on said data bit lines.

\* \* \* \* \*